United States Patent [19]
Robb

[11] Patent Number: 4,932,762
[45] Date of Patent: Jun. 12, 1990

[54] LENS TRIPLETS

[75] Inventor: Paul N. Robb, Sunnyvale, Calif.

[73] Assignee: Lockheed Missiles & Space Company, Inc., Sunnyvale, Calif.

[21] Appl. No.: 282,665

[22] Filed: Dec. 12, 1988

[51] Int. Cl.⁵ .............................................. G02B 3/12
[52] U.S. Cl. .................................. 350/418; 350/483
[58] Field of Search ............... 350/418, 419, 479, 482, 350/483

[56] References Cited
U.S. PATENT DOCUMENTS

| | | | |
|---|---|---|---|
| 2,326,970 | 8/1943 | Räntsch | 350/418 X |
| 2,490,873 | 12/1949 | Johnson | 350/418 |
| 4,702,569 | 10/1987 | Mercado et al. | 350/479 |

*Primary Examiner*—Scott J. Sugarman
*Attorney, Agent, or Firm*—John J. Morrissey

[57] ABSTRACT

An apochromatic lens triplet consists of a liquid lens element contained between two glass lens elements, where the two glass lens elements are made of the same material and are geometrically identical to each other but oriented in opposite directions along the optic axis of the triplet.

17 Claims, 6 Drawing Sheets

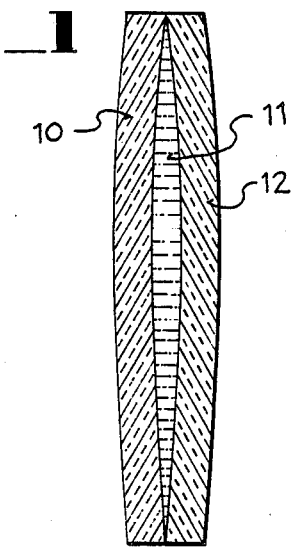
FIG_1
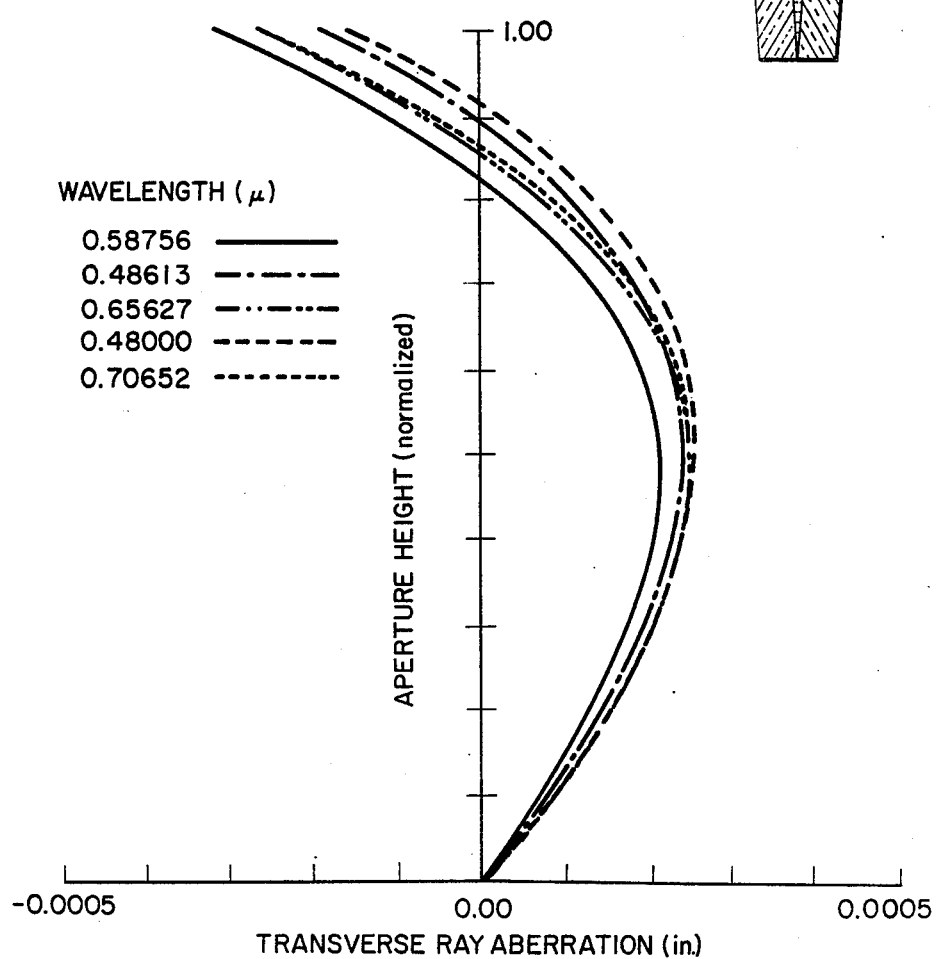
FIG_2

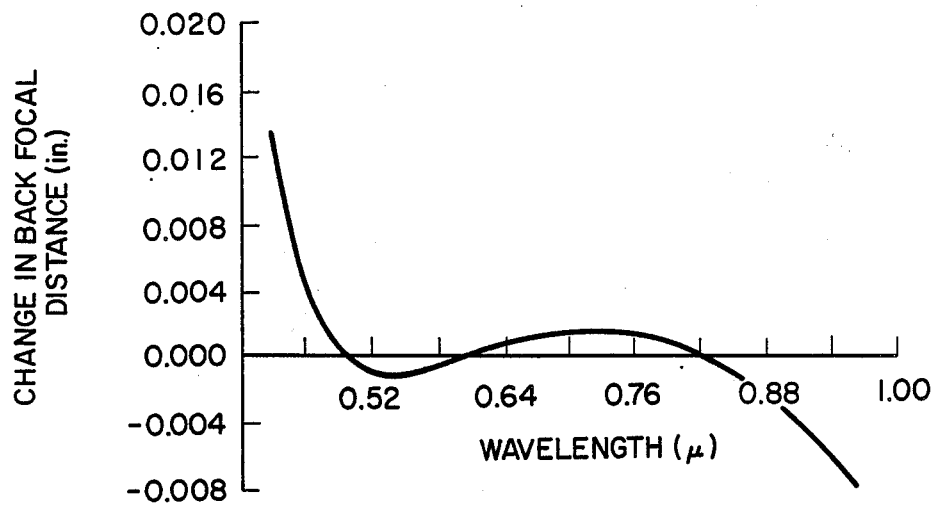
FIG_3
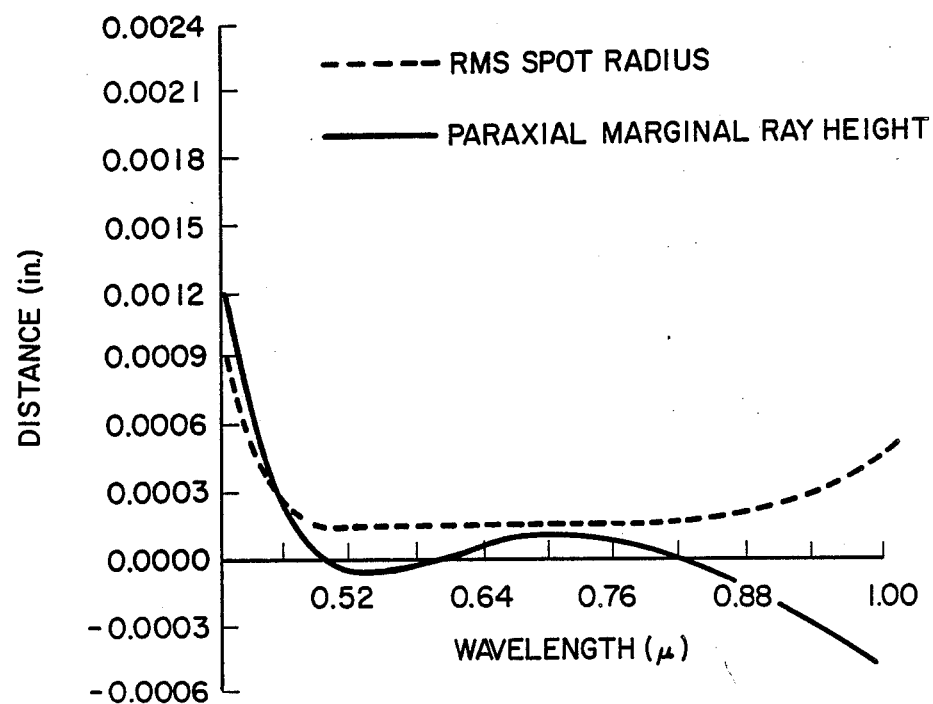
FIG_4

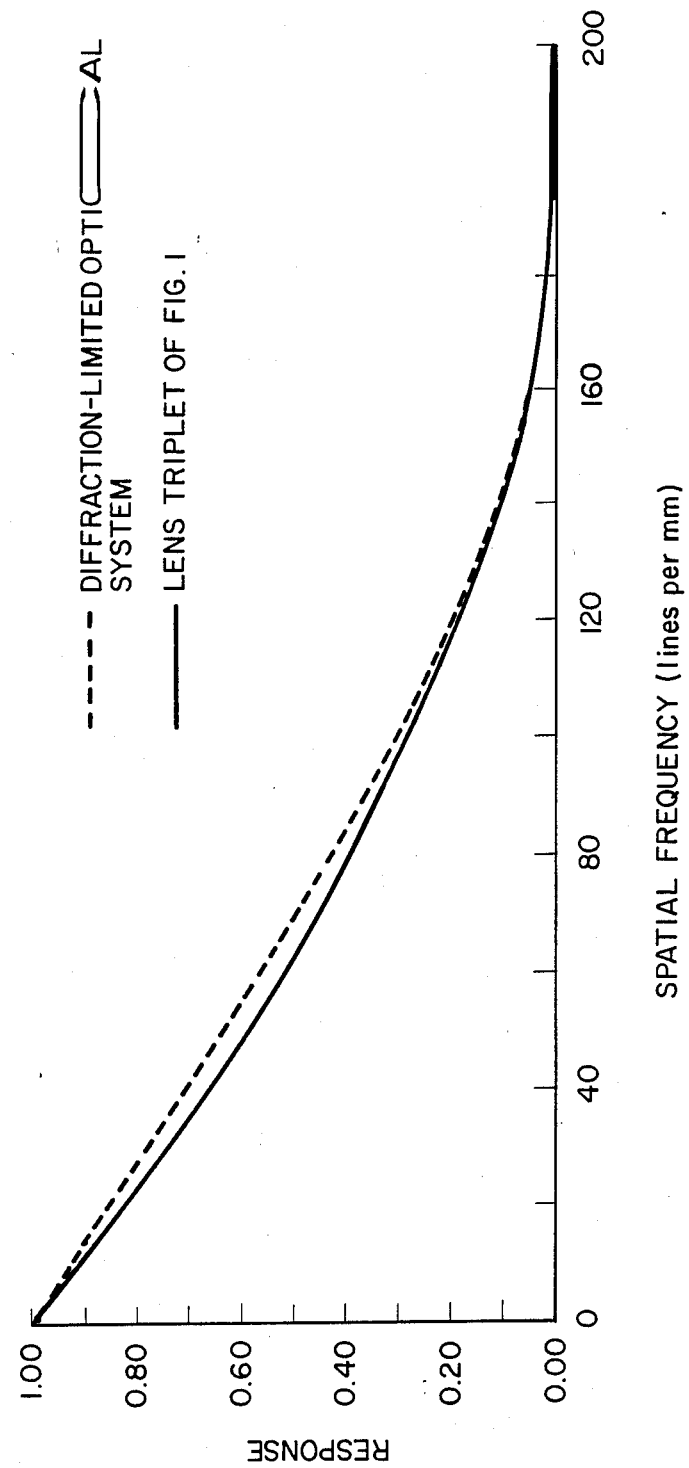

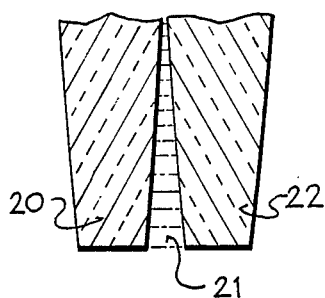
FIG_6A
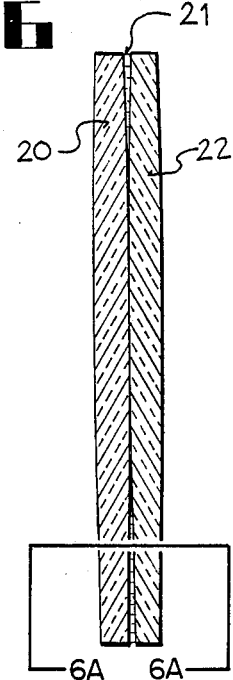
FIG_6
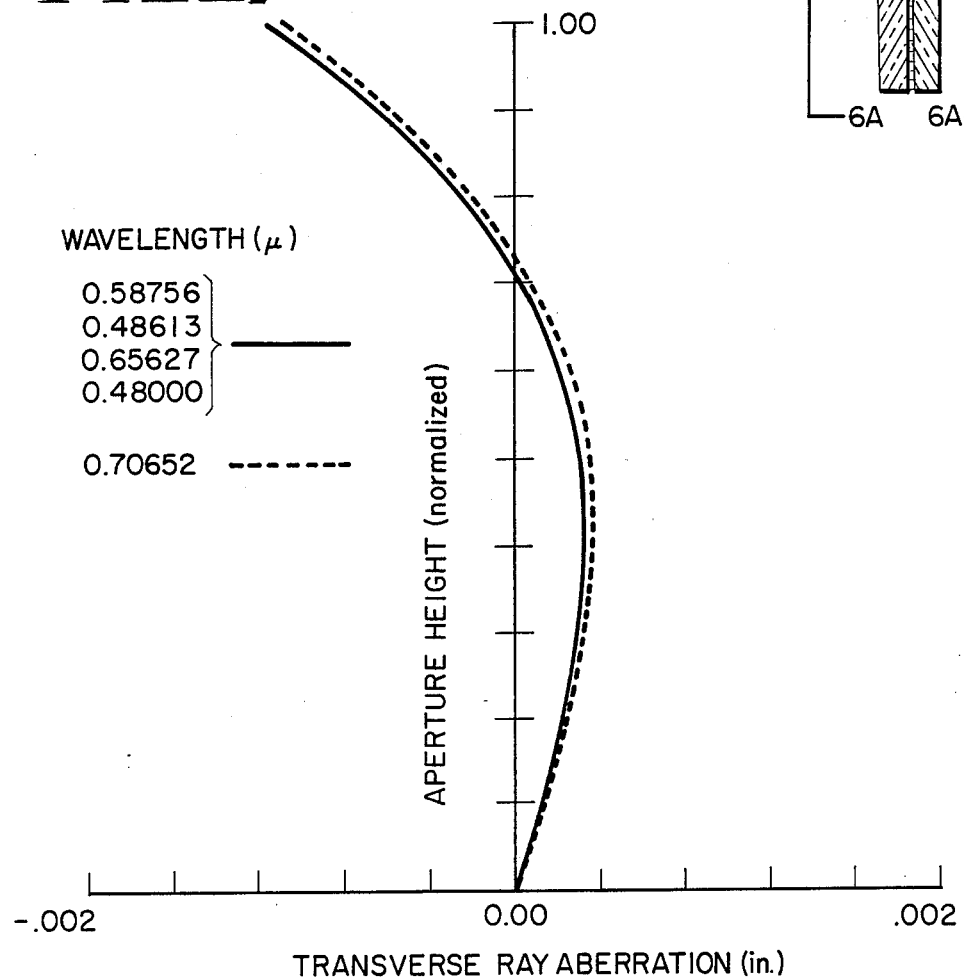
FIG_7

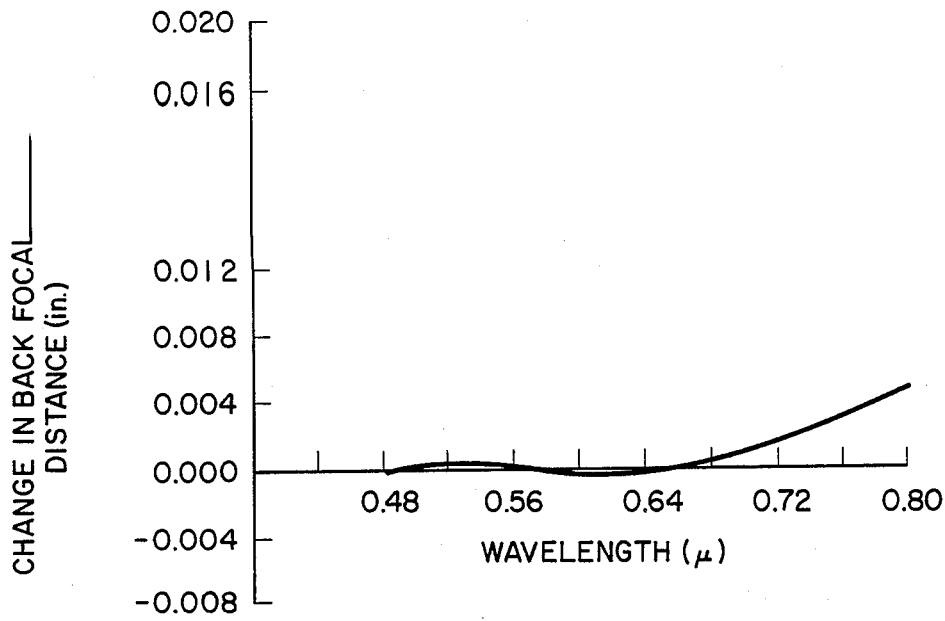
FIG_8
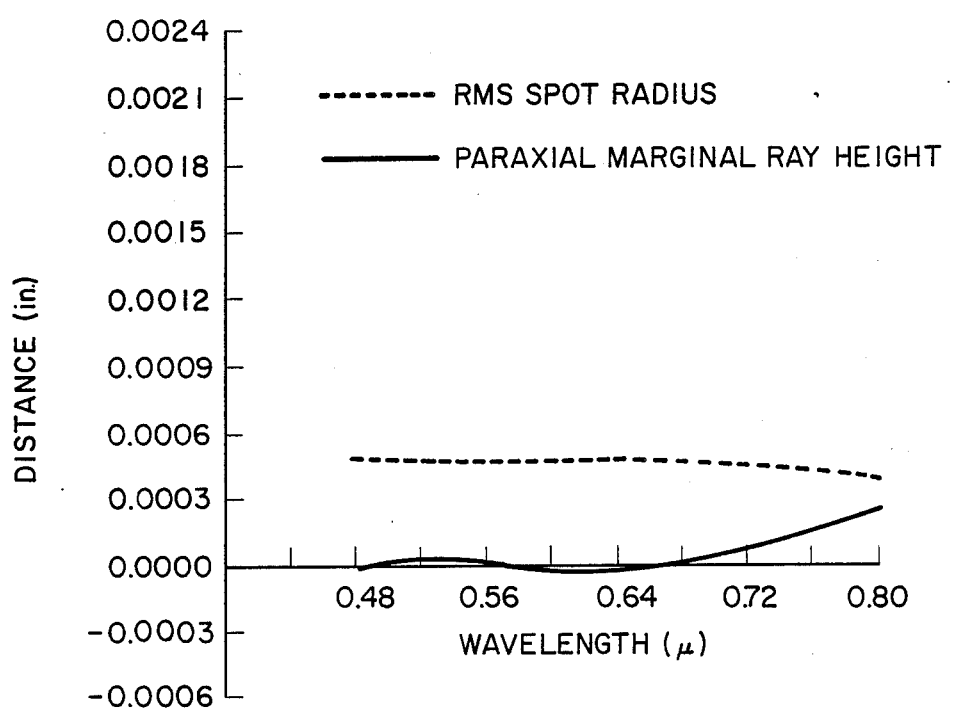
FIG_9

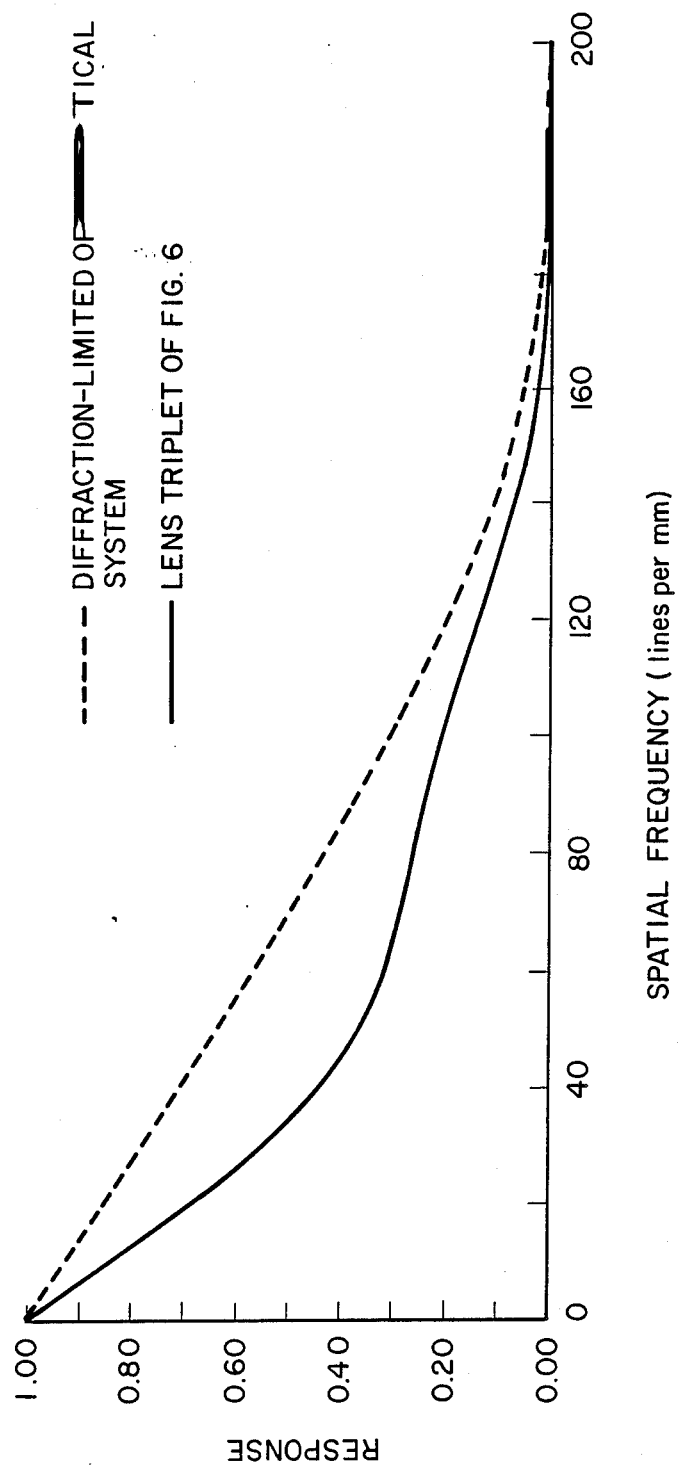
FIG_10

LENS TRIPLETS

TECHNICAL FIELD

This invention relates generally to lens design techniques, and more particularly to a technique in which a liquid lens element is contained between two identical glass lens elements to produce an inexpensive apochromatic lens triplet.

BACKGROUND OF THE INVENTION

A technique disclosed in co-pending U.S. patent application Ser. No. 419,705, filed on Sept. 20, 1982, now abandoned enables an optical designer to select compatible optical materials for the refractive elements of an optical system that is to be color-corrected at a specified number of wavelengths. A technique disclosed in copending U.S. Pat. application Ser. No. 260,106, filed on Oct. 20, 1988, enables the designer of a lens system that is to be color-corrected at a specified number of wavelengths to include one or more liquid lens elements among the lens elements of the system.

For optical systems used in certain applications, the cost of the optical materials used for the refractive elements is a major consideration. A so-called "disposable camera" is an example of an optical system for which the cost of the lens elements is of prime importance. A need has been recognized in the prior art for a lens system that is useful as a photographic objective or as a telescope objective, which is apochromatic and also well-corrected for monochromatic aberrations, and which comprises lens elements made of very inexpensive optical materials.

SUMMARY OF THE INVENTION

An apochromatic lens triplet in accordance with the present invention consists of two geometrically identical rigid lens elements made from the same kind of optical material (e.g., an optical glass), and a fluidal liquid lens element contained between the two rigid lens elements.

Particular examples are disclosed herein of apochromatic lens triplets according to the present invention, in each of which the two rigid lens elements are made from a common (and relatively inexpensive) type of optical glass and the fluidal liquid lens element is made from a common (and relatively inexpensive) type of optical liquid. For each example, the optical glass and the optical liquid are chemically stable, non-corrosive and non-toxic. Furthermore, the optical glass and the optical liquid used for the lens elements in each example are amenable to mass-production techniques for fabricating lens systems.

DESCRIPTION OF THE DRAWING

FIG. 1 is a profile drawing of a first embodiment of an apochromatic lens triplet consisting of two identical glass lens elements and a liquid lens element in accordance with the present invention.

FIG. 2 is a plot of transverse ray aberration versus aperture height at five different wavelengths for the apochromatic lens triplet of FIG. 1.

FIG. 3 is a plot of change in back focal distance versus wavelength for the apochromatic lens triplet of FIG. 1.

FIG. 4 is a combined plot of paraxial marginal ray height versus wavelength and root-mean-square spot radius versus wavelength for the apochromatic lens triplet of FIG. 1.

FIG. 5 is a combined plot of the polychromatic modulation transfer function for on-axis rays calculated at the wavelengths indicated in FIG. 2 for the apochromatic lens triplet of FIG. 1, and of the polychromatic modulation transfer function for on-axis rays calculated at the same wavelengths for an aberration-free optical system having the same aperture diameter and focal ratio as the apochromatic lens triplet of FIG. 1.

FIG. 6 is a profile drawing of a second embodiment of an apochromatic lens triplet consisting of two identical glass lens elements and a liquid lens element in accordance with the present invention.

FIG. 6A is an enlarged view of a peripheral portion of the apochromatic lens triplet of FIG. 6.

FIG. 7 is a plot of transverse ray aberration versus aperture height at five different wavelengths for the apochromatic lens triplet of FIG. 6.

FIG. 8 is a plot of change in back focal distance versus wavelength for the apochromatic lens triplet of FIG. 6.

FIG. 9 is a combined plot of paraxial marginal ray height versus wavelength and root-mean-square spot radius versus wavelength for the apochromatic lens triplet of FIG. 6.

FIG. 10 is a combined plot of the polychromatic modulation transfer function for on-axis rays calculated at the wavelengths indicated in FIG. 7 for the apochromatic lens triplet of FIG. 6, and of the polychromatic modulation transfer function for on-axis rays calculated at the same wavelengths for an aberration-free optical system having the same aperture diameter and focal ratio as the apochromatic lens triplet of FIG. 6.

BEST MODE OF CARRYING OUT THE INVENTION

As illustrated in FIG. 1, an apochromatic lens system according to the present invention is a triplet comprising three lens elements, viz., a glass lens element 10, a liquid lens element 11, and a glass lens element 12, which are disposed coaxially with respect to each other along an optic axis, and which are secured in a mounting device appropriate for the particular application. The lens triplet illustrated in FIG. 1 can be used as, e.g., a photographic objective. A technique for mounting the lens triplet of FIG. 1 is disclosed in the aforementioned U.S. Pat. application Ser. No. 260,106.

The glass lens elements 10 and 12 are geometrically identical to each other, and are both made of the same kind of optical glass (viz., a readily available and relatively inexpensive glass marketed by Schott Optical Glass Inc. of Duryea, Pa. under the catalog designation SF2). The glass lens elements 10 and 12 are oriented in opposite directions along the optic axis of the lens system, thereby presenting concave surfaces that face each other to define a cavity therebetween. The liquid lens element 11 consists of a relatively inexpensive optical liquid (viz., an immersion oil marketed by R. L. Cargille Laboratories of Cedar Grove, N.J.), which fills the cavity between the facing surfaces of the glass lens elements 10 and 12. The particular Cargille liquid used for the liquid lens element 11 is uniquely identified by the code number 478575 according to the U.S. Mil Spec system. The designation "478575" indicates the particular Cargille liquid whose index of refraction at the wavelength of the sodium D spectral line (i.e., 0.5893 micron) has the value 1.478 to three decimal places, and whose Abbe number at the same wavelength has the value 57.5 to the first decimal place.

In manufacturing lens triplets as illustrated in FIG. 1 on a mass-production scale, significant economies can be realized because only a single kind of glass lens element is used. Furthermore, the corresponding surface curvatures and the thickness along the optic axis are the same for both of the glass lens elements 10 and 12, so that the glass lens elements 10 and 12 are identical to each other. A further economy is realized because the surface curvatures of the glass lens elements 10 and 12 are spherical, and spherical lens surfaces are less costly to produce than aspherical lens surfaces.

The optical prescription for the lens triplet shown in FIG. 1 is specified in tabular format for a 10-inch focal length and an f/10 focal ratio as follows:

TABLE I

| Surface No. | Radius (inches) | Thickness (inches) | $N_d$ | $V_d$ | Material |
|---|---|---|---|---|---|
| 1 | 6.945 | 0.060 | 1.64769 | 33.85 | SF2 |
| 2 | 3.928 | 0.060 | 1.47808 | 57.60 | 478575 |
| 3 | −3.928 | 0.060 | 1.64769 | 33.85 | SF2 |
| 4 | −6.945 | 9.930 | | | |
| 5 | (image plane) | | | | | where the lens element surfaces are numbered consecutively from left to right in accordance with optical design convention. Surface No. 2 is common to the glass lens element 10 and to the liquid lens element 11, and surface No. 3 is common to the liquid lens element 11 and to the glass lens element 12. The lens surfaces are all spherical, and the "radius" listed for each surface is the radius of curvature of the surface expressed in inches. (The radius of curvature of a surface is said to be positive if the center of curvature of the surface lies to the right of the surface, and negative if the center of curvature of the surface lies to the left of the surface.) The "thickness" listed for a given surface is the thickness of the lens element bounded on the left by the given surface, where the thickness of each lens element is measured in inches along the optic axis of the system. The lens diameter is one inch, and the aperture stop is located at surface No. 1.

The column heading $N_d$ in Table I refers to the refractive index of the lens element bounded on the left by the indicated surface for the wavelength of the sodium d spectral line (i.e., for a base wavelength of 0.58756 micron). The column heading $V_d$ refers the Abbe number for the lens element bounded on the left by the indicated surface at the same base wavelength. The "material" listed for each surface in Table I refers to the type of optical material used for the lens element bounded on the left by the indicated surface. Thus, the lens elements 10 and 12 are made of Schott SF2 glass, and the lens element 11 is made of Cargille 478575 liquid.

The Cargille liquid listed in Table I is uniquely identified by the code designation "478575", which specifies the particular liquid in terms of its refractive index (to within a round-off error in the third decimal place) at the wavelength of the sodium D line. However, the values for refractive index listed in Table I for the Cargille 478575 liquid as well as for the Schott SF2 glass are the values at the wavelength of the sodium d line.

The refractive index of each of the optical materials of the lens triplet of FIG. 1 varies with wavelength. Therefore, it is instructive to evaluate the performance of the lens triplet at a number of different wavelengths in the visible spectrum in order to determine the usefulness of the lens triplet for particular applications. The values of refractive index for the optical materials of the lens triplet of FIG. 1 at five different wavelengths are given in tabular format as follows:

TABLE II

| Material | Index of Refraction | | | | |
| | $N_1$ | $N_2$ | $N_3$ | $N_4$ | $N_5$ |
|---|---|---|---|---|---|
| SF2 | 1.64769 | 1.66123 | 1.64210 | 1.66238 | 1.63902 |
| 478575 | 1.47808 | 1.48393 | 1.47563 | 1.48442 | 1.47429 | where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

A graphical indication of performance of a lens system is provided by a plot of transverse ray aberration versus aperture height. Plots of transverse ray aberration versus aperture height are given in FIG. 2 for each of the five wavelengths indicated in Table II. From the shape of the five plots shown in FIG. 2, it is apparent that performance of the lens triplet of FIG. 1 is limited by third-order spherical aberration. The closeness of the curves shown in FIG. 2 to each other indicates that the shift in focus of the lens triplet with respect to wavelength is substantially negligible.

A plot of change in back focal distance versus wavelength is shown in FIG. 3 for the lens triplet of FIG. 1. The change in back focal distance of a lens system as a function of wavelength is a measure of the extent of axial chromatic aberration of the system. The three crossings of the horizontal (i.e., wavelength) axis by the curve shown in FIG. 3 indicate the three wavelengths at which the lens triplet of FIG. 1 is color-corrected (i.e., apochromatized). Rayleigh's criterion for determining the amount of focal shift that can be tolerated for a wavefront passing through a lens system is that not more than one-quarter wavelength of optical path difference should occur over the wavefront relative to a reference sphere centered at a selected image point for the lens system. For a discussion of Rayleigh's criterion, see Warren Smith's text entitled *Modern Optical Engineering*, McGraw-Hill Book Company, Inc., 1966, page 297. The closeness of the curve shown in FIG. 3 to the horizontal axis throughout the wavelength range extending from approximately 0.47 micron to approximately 0.93 micron indicates that the apochromatic lens triplet of FIG. 1 can be used in that wavelength range without exceeding a depth-of-focus tolerance of one-quarter wavelength in accordance with Rayleigh's criterion.

In FIG. 4, paraxial marginal ray height and root-mean-square (RMS) spot radius are plotted as functions of wavelength for the apochromatic lens triplet of FIG. 1. The variation of paraxial marginal ray height of a lens system as a function of wavelength on the image plane provides an indication of the extent to which the system is corrected for axial chromatic aberration. The curve shown in FIG. 4 crosses the horizontal axis at three points, which indicate the three wavelengths at which the lens triplet of FIG. 1 brings paraxial marginal rays to a common focus (i.e., the three wavelengths at which color correction is achieved).

The curve for paraxial marginal ray height versus wavelength in FIG. 4 has the same shape as the curve for change in back focal distance versus wavelength in FIG. 3. The height of the curves shown in FIGS. 3 and 4 at any given wavelength is a measure of the magnitude of secondary and higher-order chromatic aberration of the lens triplet of FIG. 1 at that given wavelength. The fact that the curves in FIGS. 3 and 4 are very close to the horizontal axis throughout the spectral region from approximately 0.47 micron to approximately 0.93 micron (i.e., well into the near infrared region of the electromagnetic spectrum) indicates that the lens triplet of FIG. 1, as well as being apochromatic, has practically insignificant secondary and higher-order chromatic aberration throughout the wavelength range of many practical applications.

It is apparent from the curve for RMS spot radius versus wavelength plotted in FIG. 4 that the RMS spot radius of the lens triplet of FIG. 1 is nearly constant over a spectral range from approximately 0.46 micron to approximately 0.88 micron. Furthermore, the RMS spot radius for the lens triplet of FIG. 1 is equal to or less than the radius of the Airy disc for the lens triplet over a spectral range from approximately 0.46 micron to approximately 1.00 micron. Thus, at a focal length of 10 inches and a focal ratio of f/10, the lens triplet of FIG. 1 is diffraction-limited.

Because of the electromagnetic nature of optical radiation, the performance of an optical system is affected not only by geometrical aberrations (i.e., the monochromatic aberrations, chromatic aberration, and chromatic variations of the monochromatic aberrations) but also by diffraction. In a lens system, diffraction reduces the contrast of a sinusoidal input signal by an amount that varies with the spatial frequency of the input signal. In general, according to the principles of systems engineering, the performance of a system is indicated by the ratio of the amplitude of the output to the amplitude of the input. This ratio is conventionally expressed as a plot of response versus frequency. In analyzing the performance of a lens system, the "polychromatic modulation transfer function" is defined as the ratio of the modulation of the input signal to the modulation of the output signal. This ratio, plotted as a function of the spatial frequency (measured in lines per millimeter) of the input signal, indicates the performance of the lens system.

In FIG. 5, the solid-line curve is a plot of the polychromatic modulation transfer function for on-axis rays calculated at the five wavelengths listed in Table II for the lens triplet of FIG. 1. The broken-line curve in FIG. 5 is a plot of the polychromatic modulation transfer function for on-axis rays calculated at the same five wavelengths listed in Table II for an aberration-free optical system of same aperture diameter and focal ratio. The closeness of the two curves to each other in FIG. 5 indicates that the lens triplet of FIG. 1 is substantially diffraction-limited over the spectral range of Table II.

Another apochromatic lens triplet according to the present invention is illustrated in FIG. 6 in which a glass lens element 20, a liquid lens element 21, and a glass lens element 22 are disposed coaxially with respect to each other in an appropriate mounting device for use as, e.g., a photographic objective. The optical prescription for the lens triplet shown in FIG. 6 is specified in tabular format for a 10-inch focal length and an f/10 focal ratio as follows:

TABLE III

| Surface No. | Radius (inches) | Thickness (inches) | $N_d$ | $V_d$ | Material |
|---|---|---|---|---|---|
| 1 | 8.999 | 0.067 | 1.52249 | 59.48 | K5 |
| 2 | −41.236 | 0.001 | 1.85044 | 17.35 | 850173 |
| 3 | 41.236 | 0.067 | 1.52249 | 59.48 | K5 |
| 4 | −8.996 | 9.931 | | | |
| 5 | (image plane) | | | | | where the surfaces of all the lens elements are spherical and are numbered consecutively from left to right along the optic axis, and where the "radius", "thickness", "$N_d$", "$V_d$" and "material" for each of the lens surfaces are listed in accordance with the convention explained above in connection with Table 1. The lens diameter is one inch, and the aperture stop is located at surface No. 1.

The thickness of the liquid lens element 21 is quite small (only 0.001 inch), while the radius of curvature of each surface of the liquid lens element 21 is quite large (41.236 inches). Thus, the volume of the liquid lens element 21 (i.e., the volume of liquid in the space between the two glass lens elements 20 and 22) is relatively insignificant in comparison with the total volume of the triplet lens system. A peripheral portion of the lens triplet of FIG. 6 is shown in enlarged view in FIG. 6A. The liquid lens element 21 consists of Cargille 850173 liquid, which is identified by the code designation "850173" in terms of its refractive index (to within a round-off error in the third decimal place) at the wavelength of the sodium D spectral line. However, the values for refractive index listed in Table III for the Cargille 850173 liquid as well as for the Schott K5 glass are the values at the wavelength of the sodium d spectral line.

The liquid lens element 21 is practically a mere film of liquid, because the optical materials (viz., Schott K5 glass and Cargille 50173 liquid) comprising the lens triplet are selected so that the power of the liquid lens element 21 is minimized. Using such a relatively small amount of liquid for the liquid lens element 21 is advantageous, because optical absorption of the liquid decreases as the volume of the liquid lens element 21 decreases. For an extremely small volume of liquid as shown in FIG. 6 for the liquid lens element 21, a liquid of relatively high optical absorptivity can be used without substantially diminishing the intensity of light passing through the lens triplet.

The values of refractive index for the optical materials of the lens triplet shown in FIG. 6 at the same five wavelengths that were used for evaluating the performance of the lens triplet of FIG. 1 are given in tabular format as follows:

TABLE IV

| Material | Index of Refraction | | | | |
|---|---|---|---|---|---|
| | $N_1$ | $N_2$ | $N_3$ | $N_4$ | $N_5$ |
| K5 | 1.52249 | 1.52860 | 1.51982 | 1.52910 | 1.51829 |
| 850173 | 1.85044 | 1.88456 | 1.83553 | 1.88731 | 1.82722 | where $N_1$ is the refractive index at the base wavelength of 0.58756 micron, and $N_2$, $N_3$, $N_4$ and $N_5$ are the refractive indices at specified wavelengths on either side of the base wavelength. Thus, $N_2$ is the refractive index at 0.48613 micron, $N_3$ is the refractive index at 0.65627 micron, $N_4$ is the refractive index at 0.48000 micron and $N_5$ is the refractive index at 0.70652 micron.

In FIG. 7, plots of transverse ray aberration versus aperture height are given for the five wavelengths indicated in Table IV. However, over the wavelength range from 0.48000 micron to 0.65627 micron, the separation between the curves for transverse ray aberration versus aperture height for discrete wavelengths is so small that the curves cannot be distinguished from one another in the scale of FIG. 7. Therefore, in FIG. 7, the curves for the wavelengths 0.48000 micron, 0.48613 micron, 0.58756 micron and 0.65627 micron are represented by a single curve (i.e., the solid curve). The curve for the wavelength 0.70652 can be discerned (but just barely) as a separate curve (i.e., the broken curve) in FIG. 7. The lens triplet of FIG. 6 exhibits a change in transverse ray aberration of less than 0.0002 inch over a wavelength range from 0.48 micron to 0.93 micron, which means that the chromatic variation of spherical aberration is virtually absent in that range.

FIG. 8 is a plot of change in back focal distance versus wavelength for the lens triplet shown in FIG. 6. As indicated by the three crossings of the horizontal axis by the curve shown in FIG. 8, the lens triplet of FIG. 6 is apochromatic and has practically insignificant secondary and higher-order chromatic aberration throughout the wavelength range from 0.48 micron to 0.80 micron. In fact, the lens triplet of FIG. 6 can be used without exceeding Rayleigh's depth-of-focus tolerance of one-quarter wavelength over the spectral range from 0.48 to 0.93 micron.

In FIG. 9, paraxial marginal ray height and RMS spot radius are plotted as functions of wavelength at the image plane for the apochromatic lens triplet of FIG. 6. The curve for paraxial marginal ray height versus wavelength has the same shape as the curve for change in back focal distance versus wavelength as shown in FIG. 8, and indicates that geometrical blur for the lens triplet of FIG. 6 is practically insignificant over the entire visible spectrum. The RMS spot radius is substantially constant over the wavelength range from 0.46 micron to 0.80 micron. The RMS spot radius is approximately twice the radius of the Airy disc for the lens triplet of FIG. 6 at a wavelength of 0.46 micron, and is substantially equal to the radius of the Airy disc at a wavelength of 0.80 micron. Thus, the lens triplet of FIG. 6 is diffraction-limited at wavelengths of 0.80 micron and longer.

In FIG. 10, the solid-line curve is a plot of the polychromatic modulation transfer function for on-axis rays calculated at the five wavelengths listed in Table IV for the lens triplet of FIG. 6. The broken-line curve in FIG. 10 is a plot of the polychromatic modulation transfer function for on-axis rays calculated at the same five wavelengths listed in Table IV for an aberration-free optical system of the same aperture diameter and focal ratio. The separation between the two curves in FIG. 10 indicates that, although the chromatic variation of spherical aberration has been substantially eliminated for the lens triplet of FIG. 6, there is a small residual spherical aberration that reduces the polychromatic modulation transfer function to a discernible extent at the scale of 10-inch focal length for a focal ratio of f/10. However, if the lens triplet of FIG. 6 were scaled to a focal length of 3 inches or shorter for a focal ratio of f/10, the reduction in the polychromatic modulation transfer function caused by residual spherical aberration would be insignificant for practical applications.

The present invention has been described above in terms of particular embodiments. However, other embodiments within the scope of the invention would become apparent to practitioners skilled in the art of optical design upon perusal of the foregoing specification and accompanying drawing. Accordingly, the invention is defined more generally by the following claims and their equivalents.

I claim:

1. An optical objective comprising a fluidal liquid lens element contained between two rigid lens elements, said two rigid lens elements and said fluidal liquid lens element being coaxially disposed with respect to each other along an optic axis, said two rigid lens elements being made of substantially the same optical material and being of substantially identical geometrical configuration, said two rigid lens elements and said fluidal liquid lens element coacting with each other to focus optical radiation passing through said optical objective onto a focal surface with a change in focus of less than one-quarter wavelength over a wavelength range from 0.48 micron to 0.93 micron.

2. The optical objective of claim 1 wherein said two rigid lens elements are configured and positioned on said optic axis so as to bring paraxial marginal rays passing through said lens system to a common focus at more than two wavelengths.

3. The optical objective of claim 1 wherein said two rigid lens elements are made of optical glass.

4. The optical objective of claim 1 wherein said fluid liquid lens element is in contact with said two rigid lens elements.

5. An apochromatic lens triplet consisting of a fluidal liquid lens element contained between two rigid lens elements, said two rigid lens elements and said fluidal liquid lens element being coaxially disposed with respect to each other along an optic axis, said fluidal liquid lens element being in contact with said two rigid lens elements, said two rigid lens elements being made of substantially the same optical material and being of substantially identical geometrical configuration.

6. The lens triplet of claim 5 wherein said two rigid lens elements are made of optical glass.

7. A lens system color-corrected at more than two wavelengths, said lens system comprising a fluidal liquid lens element contained between two rigid lens elements, said two rigid lens elements and said fluidal liquid lens element being coaxially disposed with respect to each other along an optic axis, said two rigid lens elements being made of substantially the same optical material and being of substantially identical geometrical configuration, said two rigid lens elements and said fluidal liquid lens element co-acting with each other to bring paraxial marginal rays passing through said lens system to a common focus at the wavelengths for which said lens system is color-corrected.

8. The lens system of claim 7 wherein each of said rigid lens elements has a spherical surface with a first curvature and a spherical surface with a second curvature, said rigid lens elements being positioned so that the surfaces with said first curvature face toward each other and the surfaces with said second curvature face away from each other.

9. The lens system of claim 8 wherein the surfaces of said rigid lens elements with said first curvature are in contact with said fluidal liquid lens element.

10. The lens system of claim 7 wherein said rigid lens elements are made of optical glass.

11. The lens system of claim 10 wherein said optical glass is Schott SF2 glass, and wherein said fluidal liquid is Cargille 478575 liquid.

12. The lens system of claim 11 wherein said lens elements are configured and positioned with respect to each other along said optic axis substantially as follows:

| Surface No. | Radius (inches) | Thickness (inches) | $N_d$ | $V_d$ | Material |
|---|---|---|---|---|---|
| 1 | 6.945 | 0.060 | 1.64769 | 33.85 | SF2 |
| 2 | 3.928 | 0.060 | 1.47808 | 57.60 | 478575 |
| 3 | −3.928 | 0.060 | 1.64769 | 33.85 | SF2 |
| 4 | −6.945 | 9.930 | | | |
| 5 | (image plane) | | | | |

13. The lens system of claim 7 wherein said optical glass is Schott K5 glass, and wherein said fluidal liquid is Cargille 850173 liquid.

14. The lens system of claim 13 wherein said lens elements are configured and positioned with respect to each other along said optic axis substantially as follows:

| Surface No. | Radius (inches) | Thickness (inches) | $N_d$ | $V_d$ | Material |
|---|---|---|---|---|---|
| 1 | 8.999 | 0.067 | 1.52249 | 59.48 | K5 |
| 2 | −41.236 | 0.001 | 1.85044 | 17.35 | 850173 |
| 3 | 41.236 | 0.067 | 1.52249 | 59.48 | K5 |
| 4 | −8.999 | 9.931 | | | |
| 5 | (image plane) | | | | |

15. A lens triplet comprising a fluidal liquid lens element contained between two rigid lens elements, said two rigid lens elements and said fluidal liquid lens element being coaxially disposed with respect to each other along an optic axis, said two rigid lens elements being made of substantially the same optical material and being of substantially identical geometrical configuration, each of said two rigid lens elements having substantially spherical surfaces, said two rigid lens elements and said fluidal liquid lens element coacting with each other to form a lens system that is corrected for axial chromatic aberration, spherical aberration, and the chromatic variation of spherical aberration.

16. The lens triplet of claim 15 wherein said fluidal liquid lens element and said two rigid lens elements coact to form an image having a change in focus of less than one-quarter wavelength over a wavelength range extending from 0.48 micron to 0.93 micron.

17. The lens triplet of claim 15 wherein said fluidal liquid lens element and said two rigid lens elements coact to bring paraxial marginal rays passing through said lens triplet to a common focus at more than two wavelengths.

* * * * *